F. E. JOHANSON.
BALL CAGE FOR BALL BEARINGS.
APPLICATION FILED AUG. 5, 1916.
1,223,492.   Patented Apr. 24, 1917.
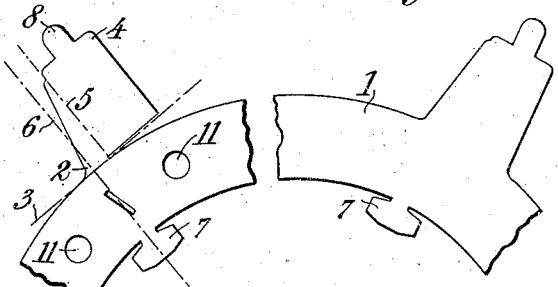
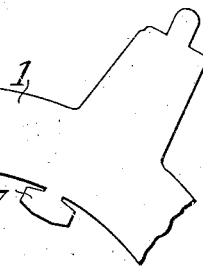
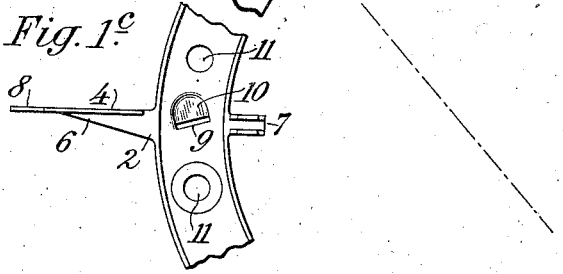
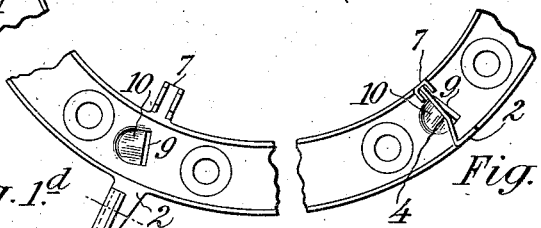
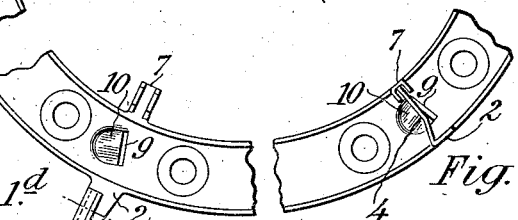
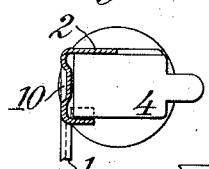
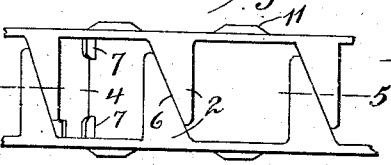
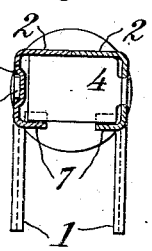
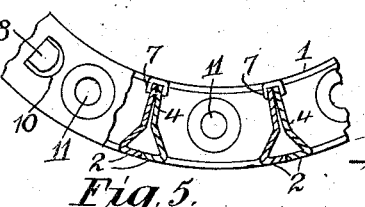
WITNESSES:
René Bruine
T. T. Wallace
INVENTOR:
Frans Emanuel Johanson
By Attorneys,
Fraser, Dirk & Myers

UNITED STATES PATENT OFFICE.

FRANS EMANUEL JOHANSON, OF GOTTENBORG, SWEDEN.

BALL-CAGE FOR BALL-BEARINGS.

1,223,492.

Specification of Letters Patent.　Patented Apr. 24, 1917.

Application filed August 5, 1916.　Serial No. 113,223.

*To all whom it may concern:*

Be it known that I, FRANS EMANUEL JOHANSON, subject of the King of Sweden, and resident of Gottenborg, Sweden, have invented new and useful Improvements in Ball-Cages for Ball-Bearings, of which the following is a specification.

This invention relates to ball cages for ball bearings of the type composed of two rings, one or both provided with projections whereby it is secured to and spaced axially from the other ring, said projections further constituting separators whereby the balls are kept apart.

The object of the invention is to provide a ball cage of this type which is strong, simple and reliable in construction, by obviating the use of separate members for securing together the various parts of which the ball cage is composed and in which the separators may yield to some extent to the pressure of the balls.

The invention consists, chiefly, in the combination with a ball cage of the type above referred to, of projections which extend inwardly from either ring or both, each projection consisting of a spacing part or bracket turned up from the edge of the ring and a wing turned up from said bracket and forming a separator for two consecutive balls.

In a ball cage comprising two rings and wings between them which separate the balls there may be employed, according to another feature of the invention, channel pieces formed by ears on the rings to receive the marginal portions of the wings and retain them in position.

According to this invention there may be provided ears on the wings and corresponding slots in the opposite cage ring to receive the ears. The portion of an ear passing through a slot is bent over in the usual way to secure the cage rings together. Recesses may be provided in the cage rings adjacent to said slots to receive the bent over portions of the ears so that a plane surface is presented to the outside.

According to another feature of the invention, when the ball-cage comprises two rings with spacing-projections on each, the projections are tapered, and the oblique edges of those on the one cage ring face the oblique edges of the projections on the other cage ring.

According to still another feature of the invention, the projections or brackets on a cage ring may be formed so as to provide recesses, and tongues may be provided in corresponding positions on the opposite ring to enter said recesses; a turned up portion may be formed on the tongue in the manner hereinafter described, in order to secure the two rings together.

Other details of the invention and various modifications thereof are hereinafter described in detail, and the novel features are set forth in the claims.

In the accompanying drawings—

Figures 1$^a$, 1$^b$, 1$^c$, 1$^d$, and 1$^e$, show segments of a cage ring of sheet-metal in different progressive stages of manufacture.

Fig. 2 shows a sectional view, on line $x$—$x$ of Fig. 1, of a finished cage ring.

Fig. 3 shows a sectional view of a part of the finished ball cage.

Fig. 4 is an edge view of a portion of the finished cage; and

Fig. 5 is a top view of a portion of the cage, partly shown in horizontal section.

The ball cage illustrated in the drawings, is adapted for use in connection with bearings having one row of balls, and it consists of two similar rings of sheet metal having preferably the shape shown. Each ring 1 is provided, at its outer edge, with projections, the radially or approximately radially extending part 2 of which, after having been bent on the line 3, Fig. 1$^b$, to lie approximately at right angles to the plane of the ring 1, forms a bracket which supports the laterally projecting portion or wing 4, which being folded on the line 5 (Fig. 1$^b$) is caused to take up a position across the ring 1. In the Fig. 1 group, five segments of the ring 1 are shown in different progressive stages of manufacture. Fig. 1$^a$ shows a segment of the ring 1 which has been subjected to a first stamping operation. The adjacent segment to the left (Fig. 1$^b$) has been subjected to a second stamping operation. Here a projection 2, 4 is shown in the same plane as the ring 1. In the third segment (Fig. 1$^c$) the portion 4 has been bent at right angles to the portion or bracket 2, and in the fourth segment (Fig. 1$^d$) the wing portion 4 has been bent as shown in section, while in the fifth segment, (Fig. 1ᵉ) the bracket 2 has been bent at right angles to the ring 1 so that the wing 4 extends across the ring 1 to the inner edge thereof.

The bending of the brackets and wings may, of course, be effected in any other order.

The ball cage above described is assembled in the following manner. One of the finished cage rings is inserted into the bearing in such a manner that each wing 4 enters between two adjacent balls. From the other side of the bearing another cage ring is inserted in such a manner that the oblique edges 6 of the brackets 2 of each ring come into contact with the corresponding oblique edges 6 of the brackets of the other ring. The meeting edges 6 will thus form a diagonal joint between two adjacent brackets 2, each bracket supporting one wing 4 at the side opposite its oblique edge. These two wings are so curved that their free edges, *i. e.* the edges at the inner circumference of the ring, will bear against each other, the wings at the outer circumference of the cage being widely separated, in the illustration, a distance equal to the width of the united brackets 2, 2. Each pair of wings will thus form a double wall between two adjacent balls.

In order to support the inner edges of the wings 4 each ring 1 is formed at its inner edge with ears 7, bent to form grooves in which enter the free ends of the wings 4. These ears are formed by projections extending from the inner edge of the ring 1 and are provided with lateral laps, said projections, in order to form the said grooves, being first bent, as shown to the left of Fig. 1ᵉ, whereupon the whole projection is bent at right angles to the ring 1, as shown in the fifth ring segment, Fig. 1ᵉ.

The inner edges of the wings carried by each two abutting brackets are both disposed in the grooves of the ears 7 of both rings. It will thus be seen that these free sides or edges of the wings are held securely together and that such free sides are supported at each end. By means of the support thus afforded the inner edge of each wing is positioned by the groove in its own ring and by the groove on the other ring.

The oblique abutting faces have a tendency to rotate the rings in opposite directions. The supports and wings, due to their manner of organization, resist such tendency, with the result of putting the parts under tension, thereby assuring, in the sheet metal cage, a rigid, light weight structure.

The connection of the two rings may be effected in different ways. In the constructional form shown in the illustrative example, the wings 4 are formed with ears 8, which, when the rings are pressed together around the balls, enter corresponding slots 9 of the opposite ring 1. The ends of said ears are then bent laterally so as to form a reliable connection between the rings. At the side of each aperture 9 the material may, preferably, have an impression or recess 10 in order to receive the bent end of the ear 8 so that the outer surface thereof will be flush with the outer surface of the cage ring 1.

The tendency to rotation of the rings due to the abutting oblique faces, causes the ears 8 to press against the sides of the slots 9, thereby increasing the tension on the various parts of the cage and adding to the rigidity of the structure and assuring that there be no relative movement of the parts after the cage is assembled and completed.

Preferably ball seats are provided in the rings 1. In the constructional form shown these consist of apertures 11 around which the material may be pressed outwardly, as shown at the bottom of Fig. 2, so as to insure the holding of the balls.

In order to increase the strength of the ball-cage, the edges of the rings may be bent as shown at the bottom of the Fig. 1 group and in Fig. 2.

Having now described my invention, what I claim as new and desire to secure by Letters Patent is:—

1. A ball cage for ball bearings, comprising two rings of sheet-metal, each of said rings carrying at its edge tapering brackets bent at substantially right angles to the plane of the ring, the oblique edges of the brackets of one cage ring facing the oblique edges of the brackets of the other cage ring, and a wing carried by each bracket and bent at substantially right angles to the plane thereof.

2. A ball cage for ball bearings, comprising two rings of sheet metal, each of said rings carrying at its edge tapering brackets bent at substantially right angles to the plane of the ring, the oblique edges of the brackets of one cage ring facing the oblique edges of the brackets of the other cage ring, a wing carried by each bracket and bent at substantially right angles to the plane thereof, and means on said wings engaging the opposite ring for holding the cage rings in assembled condition.

3. A ball cage for ball bearings, comprising two rings of sheet-metal, each of said rings carrying at its edge tapering brackets bent at substantially right angles to the plane of the ring, the oblique edges of the brackets of one cage ring facing the oblique edges of the brackets of the other cage ring, a wing carried by each bracket and bent at substantially right angles to the plane thereof, and means on said wings engaging the opposite ring for holding the cage rings in assembled condition, the said engagement of the oblique edges of the brackets and the engagement of the fastening means serving to put the parts under tension and give rigidity to the structure.

4. A ball cage for ball bearings, comprising two rings of sheet metal, each of said rings carrying brackets bent at substantially right angles to the plane of the ring and a wing carried by each bracket at one side and bent at substantially right angles to the plane of the ring, the bracket being tapering and presenting an oblique surface opposite the wing carrying side, the oblique surfaces of the brackets of one ring abutting the oblique surfaces of the brackets of the other ring, the wings carried by each two abutting brackets being curved and in engagement at their sides opposite the brackets.

5. A ball cage for ball bearings, comprising two rings of sheet metal, each of said rings carrying at its outer edge brackets bent at substantially right angles to the plane of the ring and a wing carried by each bracket at one side and bent toward the inner edge of the ring at substantially right angles to the plane of the ring, the bracket being tapering and presenting an oblique surface opposite the wing carrying side, the oblique surfaces of the brackets of one ring abutting the oblique surfaces of the brackets of the other ring, the wings carried by each two abutting brackets being curved and in engagement adjacent the inner edge of the ring at their sides opposite the brackets.

6. A ball cage for ball bearings, comprising two rings of sheet metal, each of said rings carrying brackets bent at substantially right angles to the plane of the ring and a wing carried by each bracket at one side and bent inwardly of the cage at substantially right angles to the plane of the ring, the bracket being tapering and presenting an oblique surface opposite the wing carrying side, the oblique surfaces of the brackets of one ring abutting the oblique surfaces of the brackets of the other ring, the wings carried by each two abutting brackets being curved and in engagement inwardly of the cage at their sides opposite the brackets.

7. A ball cage for ball bearings, comprising two rings of sheet metal, each of said rings carrying at its outer edge brackets bent at substantially right angles to the plane of the ring and a wing carried by each bracket at one side and bent toward the inner edge of the ring at substantially right angles to the plane of the ring, the bracket being tapering and presenting an oblique surface opposite the wing carrying side, the oblique surfaces of the brackets of one ring abutting the oblique surfaces of the brackets of the other ring, the wings carried by each two abutting brackets being curved and in engagement adjacent the inner edge of the ring at their sides opposite the brackets, and a grooved support at the inner edge of the ring opposite each bracket, the inner edges of both wings carried by each two abutting brackets being disposed in grooves of ears of both rings, the wings and supports serving to resist the tendency of the rings to rotate in opposite directions incident to the abutting of the oblique faces in assemblage, thereby putting the parts under tension and giving rigidity to the structure.

8. A ball cage for ball bearings, comprising two rings of sheet-metal, each of said rings having projections made integrally with the ring and consisting of tapering brackets bent substantially at right angles from the edge of the ring, and wings bent substantially at right angles from said brackets, the oblique edges of the brackets of one cage ring facing the oblique edges of the brackets of the other cage ring.

9. A ball cage for ball bearings, comprising two rings of sheet-metal, each of said rings having projections made integrally with the ring and consisting each of a tapering bracket bent substantially at right angles from the edge of the ring, and a wing bent substantially at right angles from said bracket, the oblique edges of the brackets of one cage ring facing the oblique edges of the brackets of the other cage ring, and the corresponding wings being curved so as to bear against each other.

10. A ball cage for ball bearings, comprising two rings of sheet-metal, each having projections made integrally with the ring and consisting each of a tapering bracket bent substantially at right angles from the edge of the ring, a wing bent substantially at right angles from said bracket, and an ear engaging the opposite cage ring, the oblique edges of the brackets of one cage ring facing the oblique edges of the brackets of the cage ring.

11. A ball cage for ball bearings, comprising two rings of sheet-metal each having projections made integrally with the ring and consisting each of a tapering bracket bent substantially at right angles from the edge of the ring, and a wing cut out from the edge of the ring and bent substantially at right angles from said bracket, the oblique edges of the brackets of one cage ring facing the oblique edges of the brackets of the other cage ring.

12. A ball cage for ball bearings, comprising two rings of sheet-metal, each of said rings having projections made integrally with the ring and consisting each of a tapering bracket bent substantially at right angles from one edge of the ring, and a wing bent substantially at right angles from said bracket and cut out from the edge of the ring, and channel-shaped projections on the other edge of the ring engaging the end of the wings, the oblique edges of the brackets of one cage ring facing the oblique edges of the brackets of the other cage ring.

13. A ball cage for ball bearings, comprising two rings of sheet-metal having seats for the balls and each carrying projections made integrally with the ring and consisting of tapering brackets bent substantially at right angles from the edge of the ring and wings cut out from the edge of the ring and bent substantially at right angles from said brackets, the oblique edges of the brackets of one cage ring facing the oblique edges of the brackets of the other cage ring.

In testimony whereof I, the said FRANS EMANUEL JOHANSON, have hereunto set my hand.

FRANS EMANUEL JOHANSON.